United States Patent
Connor et al.

(10) Patent No.: US 6,779,070 B2
(45) Date of Patent: Aug. 17, 2004

(54) DATA TRANSACTION THROUGH A BRIDGE

(75) Inventors: Patrick L. Connor, Portland, OR (US); Patrick J. Luhmann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 463 days.

(21) Appl. No.: 10/017,538

(22) Filed: Dec. 12, 2001

(65) Prior Publication Data

US 2003/0110341 A1 Jun. 12, 2003

(51) Int. Cl.[7] .............................................. G06F 13/14
(52) U.S. Cl. ..................................... 710/315; 710/313
(58) Field of Search .............................. 710/313, 315, 710/306

(56) References Cited

U.S. PATENT DOCUMENTS

| | | | |
|---|---|---|---|
| 6,341,334 B1 * | 1/2002 | Kamemaru | 711/137 |
| 6,581,129 B1 * | 6/2003 | Buckland et al. | 710/306 |
| 2002/0083257 A1 * | 6/2002 | Shah | 710/310 |

* cited by examiner

*Primary Examiner*—Glenn A. Auve
*Assistant Examiner*—Nimesh Patel
(74) *Attorney, Agent, or Firm*—Justin B. Scout

(57) ABSTRACT

The present disclosure relates to a method and apparatus to improve the transmission of data between two or more buses, wherein a bridge is used to predict a characteristic of a data transaction that occurs between a first bus, which utilizes a protocol that does not supply the characteristic, and a second bus, which utilizes a protocol that may make use of this information.

40 Claims, 3 Drawing Sheets

Fig. 3
Percentage of Transaction to Buffer

| Throughput First Bus | | | |
|---|---|---|---|
| 125 MBps | 250 MBps | 500 MBps | |
| 80% | 70% | 50% | 500 MBps |
| 90% | 80% | 60% | 750 MBps |
| 90% | 80% | 70% | 1000 MBps |
| | | | Throughput Second Bus |

DATA TRANSACTION THROUGH A BRIDGE

BACKGROUND

1. Field

The claimed subject matter relates to a method and apparatus to improve the transmission of data between two or more buses.

2. Background Information

Often two or more bus protocols may co-exist within a device or system. This may occur in a variety of circumstances, such as, for example, as one bus protocol begins to supplant another bus protocol, the two protocols may co-exist and be utilized substantially simultaneously within a system. In this context, a device, which translates or reformats data transactions from one bus protocol to another, is referred to, in this context, as a bridge.

Typically, there is a loss in efficiency and throughput when a data transaction is translated or reformatted by a bridge. Depending on the protocols utilized, one protocol may utilize information not provided by the other. In this case, the loss in throughput and efficiency may be increased. For example, if a data transaction transmits data from the bus utilizing the protocol without the extra information (hereafter, "the first bus") to the bus utilizing the protocol with the extra information (hereafter, "the second bus"), a bridge may not initiate a data transfer on the second bus until the bridge is capable of accurately generating the missing information. In a specific example, currently, if a data transaction occurs between a bus which does not specify the length of the data transaction (the first bus), and a bus with does specify the length of the data transaction (the second bus), the bridge will buffer the entire transaction to determine the proper length of the transaction, before initiating a data transfer on the second bus. This may create a loss of efficiency and throughput as the data transaction may be stalled while being buffered. A need, therefore, exists for an improved system or technique for the transmission of data between two or more buses.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

FIG. 3 is a table, which may be used in some embodiments of the claimed subject matter to determine the amount of data to buffer.

DETAILED DESCRIPTION

In the following detailed description, numerous details are set forth in order to provide a thorough understanding of the present claimed subject matter. However, it will be understood by those skilled in the art that the claimed subject matter may be practiced without these specific details. In other instances, well-known methods, procedures, components, and circuits have not been described in detail so as to not obscure the claimed subject matter.

In this context, a data transfer is the transmission of data from one component to another. For example, in order to transmit data, from a source component to a destination component via a number of intermediate components, a series of data transfers may be performed.

In this context, a data transaction is considered to be a particular type of data transfer. For purposes of the claimed subject matter, a data transaction is the transmission of data from a source component to a destination component. A data transmission may involve a number of intermediate components and, therefore, a number of data transfers. Alternatively, a data transaction may not involve any intermediate components and, therefore, only one data transfer.

In this context, a data transaction will typically further involve the transmission of this data across a bridge, which translates or reformats data in such a way as to allow buses, employing different protocols, to communicate. For example, a data transaction may include a data transfer between a source component and a bridge, and a subsequent or substantially concurrent data transfer between the bridge and a destination component.

Also, in this context, a bus includes a media which facilitates the transmission of a collection of signals and is utilized to transmit information from one component, which is coupled to the bus, to another component, which is coupled to the bus. One skilled in the art will understand that such a media and, likewise, a collection of signals may take many forms.

Figure 1:
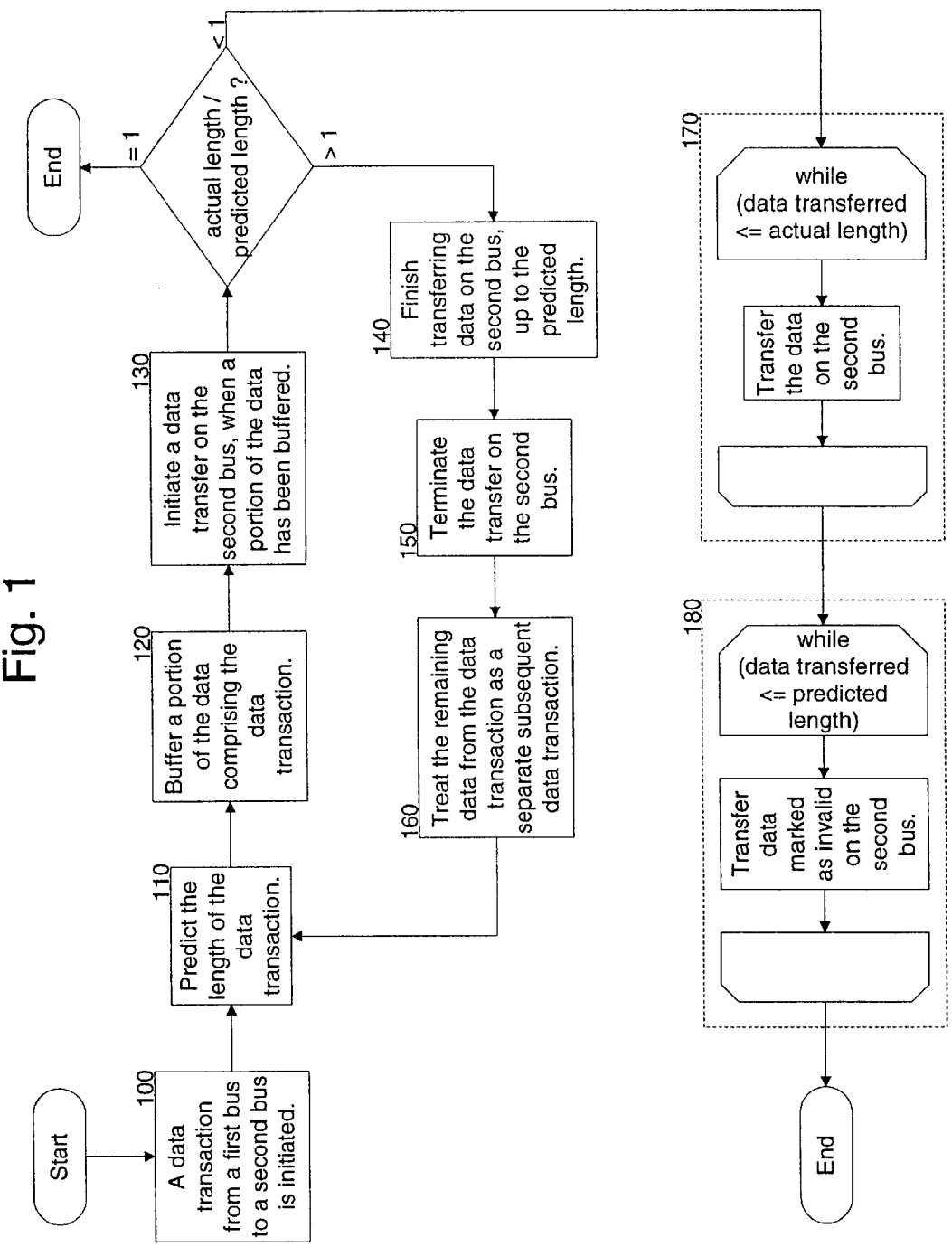
FIG. 1 is a flow chart illustrating an embodiment of a technique for transferring data between two buses.

FIG. 1 is a flowchart of a technique for the transmission of data between two or more buses. FIG. 1 illustrates an embodiment where a data transaction occurs between a first bus, which utilizes a protocol that does not supply the length of the data transaction, and a second bus, which utilizes a protocol that may make use of this information. Of course, one skilled in the art will realize that this technique may be extended to accommodate more than two buses. In addition, the claimed subject matter is not limited to this one embodiment illustrating a two bus example. Furthermore, while this one embodiment of the claimed subject matter illustrates and example where the first bus does not supply the length of the transaction, one skilled in the art will realize that the technique may be adjusted to provide for other embodiments where other particular characteristics of the data transaction are not provided by the first bus. Such characteristics may include, but are not limited to, examples, such as, length, data packet size, data packet priority, etc.

As illustrated by action 100, a data transaction from a first bus to a second bus may be initiated. This data transaction may occur between a first bus, which utilizes a protocol wherein the length of the data transaction is not specified, and a second bus, which utilizes a protocol wherein the length of the data transaction is specified. In a specific example, their may comprise a data transaction originating from a first bus which utilizes a protocol substantially compliant with the Peripheral Component Interconnect (PCI) protocol, that is *PCI Local Bus Specification*, Revision 2.2, PCI-SIG, Dec. 18, 1998. The data transaction may include a destination component on a second bus that utilizes a protocol substantially compliant with the Peripheral Component Interconnect Extended (PCI-X) protocol, that is *PCI-X Addendum to the PCI Local Bus Specification*, Revision 1.0, PCI-SIG, Sep. 22, 1999. However, this is merely a specific illustrative example, and one skilled in the art will realize that other protocols and forms of buses may be used.

As illustrated by action 110, the bridge may attempt to predict the length of the data transaction. The length of the data transaction may be utilized by the protocol operating on the second bus. As one skilled in the art will realize, this prediction may be accomplished by a variety of techniques, such as, for example, a substantially predetermined or configurable value, a table correlating the source or destination address with the length of the data transfer, or the type of data transaction. However, one skilled in the art will realize that other techniques may be used. In addition, one skilled in the art will realize that such a prediction may or may not be accurate.

As illustrated by action 120, a portion of the data comprising the data transaction may be buffered by the bridge. Unlike traditional approaches, which often buffer the entire data transaction in order to generate the actual length of the data transaction so that it may be transmitted on the second bus utilizing the predicted length of the data transaction, a portion substantially less than the entire data transaction may be buffered. However, one skilled in the art will understand that there may be circumstances where buffering the data transaction in its entirety may be desirable, such as, for example, circumstances where the data transaction is short or the throughput of the buses is significant asymmetric; however, other examples are possible.

Action 120 may also include a determination of the amount of data to buffer. In a specific example, to which the claimed subject matter is, of course, not limited, FIG. 3 illustrates a table which may be used in a particular embodiment to determine the percentage of the predicted length of a data transaction to buffer based upon the maximum throughput of first and second buses. To continue the specific example, if the first bus comprises a PCI bus operating at 33 MHz and utilizing 64 bits (a throughput of approximately 250 megabytes per second (MBps)), and if the second bus comprises a PCI-X bus operating at 133 MHz and utilizing 64 bits (a throughput of approximately 1,000 MBps), 80% of the predicted length of the data transaction may be buffered.

However, one skilled in the art will realize that this is merely one example and other techniques for determining the selected amount of data to buffer are possible. For example, in addition to utilizing the relative throughput of the buses, at least one or more of the following variety of factors may be utilized to determine the size of the portion of data to be buffered, such as: a substantially predetermined or configurable value, the type of data transaction, the address of the source or destination components, the activity upon the buses or the length of the previous data transaction. One skilled in the art will realize that a variety of other factors may also be used.

As illustrated by action 130, the bridge may initiate a data transfer on the second bus, once a portion of data has been buffered. Unlike traditional approaches, that often do not initiate a data transfer upon the second bus until the entire data transaction has been buffered, the data transaction may complete more quickly by initiating the data transfer on the second bus with a portion of the data buffered. In some embodiments, initiating a data transfer on the second bus may include transferring a value representing the predicted length of the data transaction on the second bus. Furthermore, if the predicted length is substantially equal to the actual length of the data transaction, once the predicted length of data has been transferred, no further action may be desired.

An embodiment of the technique illustrated by FIG. 1 may involve certain techniques to accommodate the occurrence where the predicted length of the data transaction differs from the actual length of the data transaction. In one embodiment, illustrated by actions 170 and 180, if the predicted length is greater than the actual length, the bridge may transfer the data transaction in its entirety, but upon exceeding the length of the actual length of the data transaction, may transmit data which is marked as invalid until the predicted length has been transferred on the second bus. This may be useful, for example, when the protocol utilized by the second bus would have difficulty processing a data transaction which is shorter than the length specified at the beginning of the transfer, for example, such as, specified during action 130. One skilled in the art will understand that data may be marked as invalid via a variety of techniques. To return to the above specific example, if the second bus utilizes the PCI-X protocol, the data may be marked as invalid by de-asserting the byte enable bits of the data. In other protocol schemes, one skilled in the art will realize that other techniques may be appropriate or desirable. One skilled in the art will further realize that other techniques for accommodating the instance where the predicted length is greater than the actual length may be utilized and might vary depending upon the protocol or circumstance encountered.

As illustrated by actions 140, 150, and 160, when the predicted length is less than the actual length of the data transaction, the bridge may reformat the data transaction in such a way as to cause the second bus to treat the data transaction as two separate transactions. For example, action 140 illustrates that the bridge may transfer data on the second bus until the predicted length of data has been transferred. Action 150 illustrates that once the predicted length of data has been transferred, the bridge may terminate the data transfer on the second bus. This may cause the second bus to view the initial data transaction as being complete, while the first bus continues to operate as if the initial data transaction is still occurring. Action 160 illustrates that the bridge may then treat the remaining un-transferred data from the initial data transaction as a separate subsequent data transaction. As a result, the bridge may repeat actions 110–130. Such a technique may allow the second bus to gracefully perform two smaller data transactions, while the first bus performs a single larger data transaction. One skilled in the art will understand that other techniques for accommodating the situation where the predicted length is smaller than the actual length of the data transaction are possible and that this is merely one non-limiting embodiment of the claimed subject matter.

Of course, one skilled in the art will understand that a series of machine readable instructions, which when executed by a machine execute the technique illustrated in FIG. 1, may be stored in a particular medium. Such instructions may provide the capability to execute all of merely a portion of the technique illustrated by FIG. 1. One skilled in the art will understand that these instructions may be stored in or on a variety of media, such as, for example, firmware, programmable memory, compact discs, etc.

Figure 2:
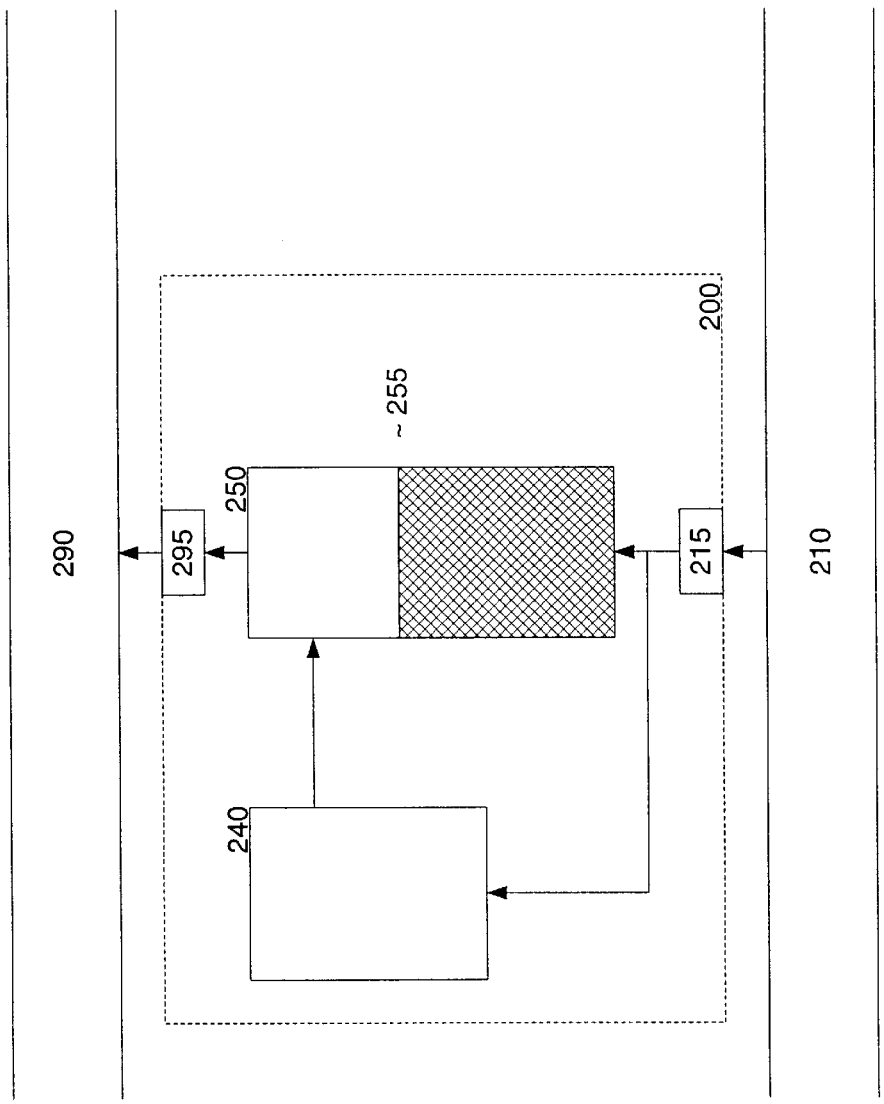
FIG. 2 is a block diagram illustrating an embodiment of an apparatus for data transfer through a bridge in accordance with the claimed subject matter.

FIG. 2 is a block diagram illustrating a system or apparatus for the transmission of data between two or more buses. FIG. 2 illustrates an embodiment where a data transaction occurs between a first bus 210, which utilizes a protocol that does not supply the length of the data transaction, and a second bus 290, which utilizes a protocol that may make use of this information. Of course, one skilled in the art will realize that this apparatus may be extended to accommodate more than two buses. In addition, the claimed subject matter is not limited to this one embodiment illustrating a two bus example.

Such a system may include a first bus 210 which may be coupled to a first data port 215 on a bridge 200 and a second bus 290 which may be coupled to a second data port 295 on the bridge 200. These buses may be coupled via the bridge as to allow a data transaction to occur between the first and second bus. The first data port may be configured so as to transmit data via a protocol, utilized by the first bus, wherein the length of the data transaction is not specified. In a specific example, to which the claimed subject matter is, of course, not limited, the first data port may transmit data via a protocol substantially compliant with the Peripheral Component Interconnect (PCI) protocol. The second data port may be configured so as to transmit data via a protocol, utilized by the second bus, wherein the length of the data transaction is specified. To continue the above specific non-limiting example, the second data port may transmit data via a protocol substantially compliant with the Peripheral Component Interconnect Extended (PCI-X) protocol. However, these are merely specific illustrative examples, and one skilled in the art will realize that other protocols and forms of buses may be used.

In addition, bridge 200 may include a control circuit 240, which is capable of predicting the length of a data transaction between the first and second data ports and a buffer 250 which may buffer a portion of the data comprising the data transaction. During operation, the control circuit may attempt to predict the length of the data transaction. A value representing this predicted length may be transferred via the second data port as part of a data transfer upon the second bus. One skilled in the art will realize that a plethora of techniques may be utilized to predict the length of the data transaction, such as, for example, a substantially predetermined or configurable value, a table correlating the source or destination address with the length of the data transfer, or the type of data transaction. However, one skilled in the art will realize that other techniques may be used.

The buffer 250 may buffer a portion of the data transaction before initiating a data transfer from the second data port. However, one skilled in the art will understand that there may be circumstances where buffering the data transaction in its entirety may be desirable, such as, for example, circumstances where the data transaction is short or the throughput of the buses is significantly asymmetric. In some embodiments, initiating a data transfer via the second data port may include transferring a value representing the predicted length of the data transaction on the second bus.

The control circuit may also be capable of generating a determination of the amount of data to buffer, illustrated as level 255. In a specific example, to which the claimed subject matter is not limited, FIG. 3 illustrates a table which may be used in some embodiments to determine the percentage of the predicted length of a data transaction to buffer based upon the maximum throughput of first and second buses. Such a technique was previously described.

However, one skilled in the art will realize that this is merely one example and other techniques for determining the selected amount of data to buffer are possible. For example, in addition to utilizing the relative throughput of the buses, at least one or more of the following variety of factors may be utilized to determine the size of the portion of data to be buffered, such as: a substantially predetermined or configurable value, the type of data transaction, the address of the source or destination components, the activity upon the buses or the length of the previous data transaction. One skilled in the art will realize that a variety of other factors may also be used.

In addition, control circuit 240 may be capable of performing a variety of actions in order to accommodate the situation where the predicted length and the actual length of the data transactions differ. In one embodiment, the control circuit may be capable of performing actions substantially in compliance with actions 140–170 as illustrated in FIG. 1. However, one skilled in the art will realize that other actions and capabilities may be possible and/or desirable and that the claimed subject matter is not limited to the illustrated actions.

One skilled in the art will realize that varying degrees of integration of the bridge and buses is contemplated by the claimed subject matter. Some integration may include, such as, for example, aggregating the data ports, control circuit and buffer on a single integrated circuit, on separate integrated circuits, or even integrating one or more of the buses and the bridge on a single integrated circuit; however, these are merely a few examples. One skilled in that art will realize that other forms and degrees of integration are possible.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

What is claimed is:

1. A method comprising:

predicting a characteristic of a data transaction between a first and a second bus, which is not provided by the first bus;

buffering a portion of data from the data transaction; and initiating a data transfer via the second bus, including a value representing the predicted characteristic of the data transfer, after the portion of data has been buffered.

2. The method of claim 1, wherein predicting a characteristic of a data transaction between a first and a second bus, which is not provided by the first bus includes predicting the length of a data transaction between a first and a second bus.

3. The method of claim 2, wherein the first bus utilizes a first protocol wherein the length of the data transaction is not specified, and the second bus utilizes a second protocol wherein a value related to the length of the data transaction is specified.

4. The method of claim 3, wherein the first protocol comprises a Peripheral Component Interconnect (PCI) protocol and the second protocol comprises a Peripheral Component Interconnect Extended (PCI-X) protocol.

5. The method of claim 2, further comprising transferring an amount of data equal to the predicted length via the second bus.

6. The method of claim 5, wherein transferring an amount of data via the second bus includes transferring data of the data transaction, until either, whichever occurs first, all of the actual data of the data transaction has been transferred or the predicted length of the data transaction has been transferred.

7. The method of claim 6, further comprising, if all of the actual data of the data transaction has been transferred before the predicted length of the data transaction has been transferred, transferring data, which is marked as being invalid.

8. The method of claim 6, further comprising, if all of the predicted data of the data transaction has been transferred before the actual length of the data transaction has been transferred, treating the remaining portion of the data transaction as a second data transaction.

9. The method of claim 8, wherein treating the remaining portion of the data transaction as a second data transaction includes:

predicting the length of the second data transaction, utilizing, at least in part, the previously predicted length;

buffering a portion of data from the second data transaction; and initiating a data transfer via the second bus, including a value representing the predicted length of the second data transfer, after the portion of data has been buffered.

10. The method of claim 1, wherein buffering further comprises determining a selected amount of data from the data transaction to buffer.

11. The method of claim 10, wherein determining comprises computing a percentage of a predicted length of the data transaction to buffer.

12. The method of claim 10, wherein determining comprises computing a portion of the data transaction to buffer based at least in part upon at least one of the following: a relative throughput of the first and second buses, a type of data transaction, an address involved in the data transfer, a level of activity upon the buses, and a length of a previous data transaction.

13. The method of claim 10, wherein buffering comprises buffering the entire data transaction.

14. The method of claim 1, wherein predicting comprises utilizing at least one of the following: a predetermined value, a table correlating an address associated with the data transaction with a length of a previous data transaction associated with the address, and a type of data transaction.

15. An apparatus comprising:

a first data port of the apparatus, which is capable of receiving data from a source outside the apparatus;

a second data port of the apparatus, which is capable of transmitting data to a destination outside the apparatus;

a control circuit which is capable of predicting a length of a data transaction involving the first and second data ports; and a buffer to buffer a portion of data from the data transaction;

wherein the first and second data ports, the control circuit and the buffer are coupled so as to, during operation, transfer data via the second data port after the portion of data has been buffered.

16. The apparatus of claim 15, wherein the first data port is configured to, during operation, receive data via a protocol wherein the length of the data transaction is not specified, and the second data port is configured to, during operation, transmit data via a protocol wherein a value related to the length of the data transaction is specified.

17. The apparatus of claim 16, wherein the first data port is configured to, during operation, receive data via a protocol substantially compliant with a Peripheral Component Interconnect (PCI) protocol, and the second data port is configured to, during operation, transmit data via a protocol substantially compliant with a Peripheral Component Interconnect Extended (PCI-X) protocol.

18. The apparatus of claim 16, wherein the second data port, and the control circuit are further coupled so as to, during operation, transfer a value representing the predicted length of the data transaction via the second data port.

19. The apparatus of claim 18, wherein the control circuit determines the amount of the portion of data to buffer based at least in part upon one of the following: a relative throughput of the first and second data ports, a type of data transaction, an address involved in the data transfer, a level of activity on the buses, and a length of a previous data transaction.

20. The apparatus of claim 15, wherein the control circuit further comprises a capability to, during operation, determine an amount of the portion of data to buffer.

21. The apparatus of claim 20, wherein the control circuit further comprises a capability to, during operation, determine an amount of the portion of data to buffer by determining a percentage of the predicted length of the data transaction to buffer.

22. The apparatus of claim 20, wherein the amount of the portion of data to buffer comprises the entire data transaction.

23. The apparatus of claim 15, wherein the control circuit is capable of utilizing at least one of the following to predict a length of a data transaction: a predetermined value, a table correlating an address associated with a data transaction with the length of a previous data transaction associated with an address, and a type of data transaction.

24. The apparatus of claim 15, wherein the first and second data ports, the control circuit and the buffer are further coupled so as to, during operation, if an actual length of the data transaction is longer than the predicted length, terminate a current data transfer via the second data port, and initiate a subsequent data transfer comprising a remaining portion of the data transaction.

25. The apparatus of claim 24, wherein the apparatus is capable of transferring at least the predicted length of data via the second data port before terminating the current data transfer.

26. The apparatus of claim 15, wherein the first and second data ports, the control circuit and the buffer are further coupled so as to, during operation, transfer an amount of data equal to the predicted length of the data transaction.

27. The apparatus of claim 26, wherein the apparatus is capable of transferring data, which is marked as invalid, if all of actual data of the data transaction is transferred before the predicted length of the data transaction is transferred.

28. A system comprising:

a first and a second bus;

a first data port of the system, which is capable of receiving data via the first bus;

a second data port of the system, which is capable of transmitting data via the second bus;

a control circuit which is capable of predicting a length of data transaction between the first and second data ports; and a buffer to buffer a portion of data comprising the data transaction;

wherein the first and second buses, the first and second data ports, the control circuit and the buffer are coupled so as to, during operation, transfer data from the second data port after the portion of data has been buffered.

29. The system of claim 28, wherein the first data port is configured to, during operation, receive data via a protocol wherein the length of the data transaction is not specified, and the second data port is configured to, during operation, transmit data via a protocol wherein a value related to the length of the data transaction is specified.

30. The system of claim 29, wherein the first bus is configured to, during operation, utilize a protocol substantially compliant with a Peripheral Component Interconnect (PCI) protocol, and the second bus is configured to, during operation, utilize a protocol substantially compliant with a Peripheral Component Interconnect Extended (PCI-X) protocol.

31. The system of claim 29, wherein the first and second data ports, the control circuit and the buffer are further coupled so as to, during operation, transfer a value representing the predicted length of the data transaction.

32. The system of claim 28, wherein the control circuit further comprises a capability to, during operation, determine an amount of data to buffer.

33. The system of claim 32, wherein the control circuit determines an amount of the data transaction to buffer based at in part upon at least one of the following: a relative throughput of the first and second data ports, a type of data transaction, an address involved in the data transfer and a length of a previous data transaction.

34. The system of claim 32, wherein the control circuit determines an amount of the data transaction to buffer by determining a percentage of the predicted length of the data transaction to buffer.

35. The system of claim 32, wherein the amount of the portion of buffer to data comprises the entire data transaction.

36. The system of claim 28, wherein the control circuit is capable of predicting the length of a data transmission utilizing at least one of the following: a predetermined value, a table correlating an address associated with the data transaction with the length of a previous data transaction associated with the address, or a type of data transaction.

37. The apparatus of claim 28, wherein the first and second data ports, the control circuit and the buffer are further coupled so as to, during operation, if an actual length of the data transaction is longer than the predicted length, terminate a current data transfer via the second data port, and initiate a subsequent data transfer comprising a remaining portion of the data transaction.

38. The apparatus of claim 37, wherein the apparatus is capable of transferring at least the predicted length of data via the second data port before terminating the current data transfer.

39. The apparatus of claim 28, wherein the first and second data ports, the control circuit and the buffer are further coupled so as to, during operation, transfer an amount of data equal to the predicted length of the data transaction.

40. The apparatus of claim 39, wherein the apparatus is capable of transferring data, which is marked as invalid, if all actual data of the data transaction is transferred before the predicted length of the data transaction is transferred..

* * * * *